No. 806,167. PATENTED DEC. 5, 1905.
D. R. MORRISON.
PISTON.
APPLICATION FILED MAR. 17, 1904.
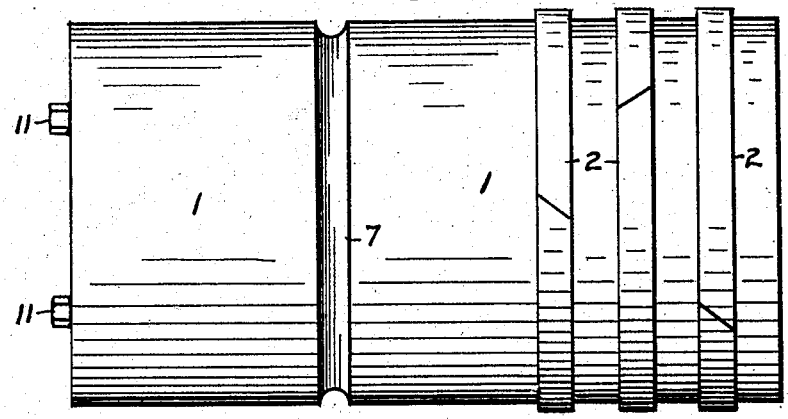
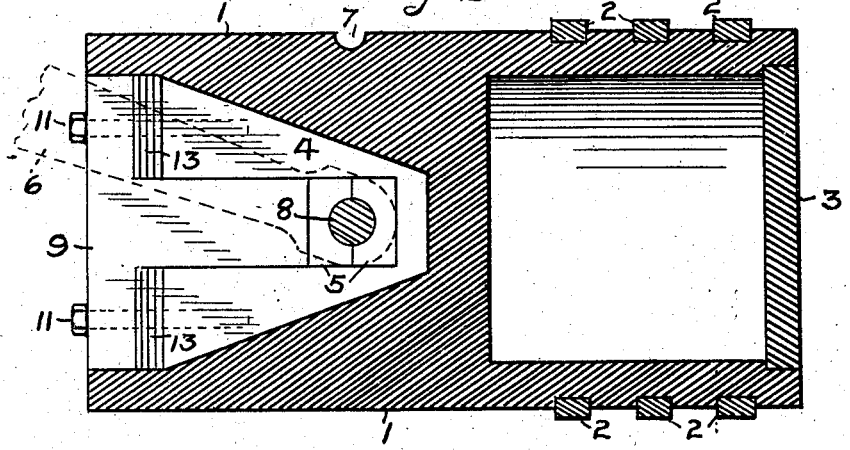
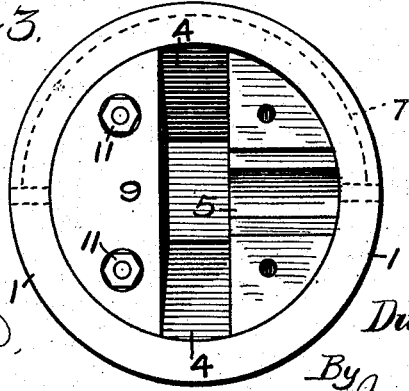
Witnesses:
Lula Maschmeyer,
F. W. Koerner.
Inventor,
Dudley R. Morrison,
By Joseph A. Minturn,
Attorney.

UNITED STATES PATENT OFFICE.

DUDLEY R. MORRISON, OF HARTFORD CITY, INDIANA.

PISTON.

No. 806,167.  Specification of Letters Patent.  Patented Dec. 5, 1905.

Application filed March 17, 1904. Serial No. 198,615.

*To all whom it may concern:*

Be it known that I, DUDLEY R. MORRISON, a citizen of the United States, residing at Hartford City, in the county of Blackford and State of Indiana, have invented certain new and useful Improvements in Pistons, of which the following is a specification.

This invention relates to improvements in piston constructions for engines in which the pitman from the piston is pivotally connected directly with the latter; and the main objects of the invention are, first, to provide a take-up mechanism at the joint between the pitman and piston, whereby the looseness due to wear can be readily taken up, and, second, to provide means for a thorough lubrication of the joint.

Other objects and advantages will appear in the description and statement of operation hereinafter contained.

I accomplish the objects of the invention by the mechanism illustrated in the accompanying drawings, in which—

Figure 1 is a top plan view of my invention. Fig. 2 is a longitudinal vertical section of same, and Fig. 3 a view of that end of the piston into which the pitman is inserted.

Like characters of reference indicate like parts throughout the several views of the drawings.

The prevailing practice heretofore has been to provide a fixed pin to which the pitman is movably affixed. Such a construction is difficult of lubrication and is hard to keep tight and to keep the parts from knocking after much use, because the inaccessible location of the wearing parts makes the application of a take-up mechanism impracticable.

1 represents the walls of the piston. This piston is hollow at its outer end, being that end which is shown at the right in Fig. 2, and the chamber thus formed is closed by means of the removable plate 3.

2 represents the packing-rings, of usual construction, surrounding this end of the piston. Formed in the opposite end of the piston is a vertical recess 4, in which the pitman 6 (shown in dotted lines in Fig. 2) is inserted. The side walls of the recess 4 are provided with rectangular grooves to receive the journal-boxes 5 for a pin 8, to which the pitman 6 is attached. The pin 8 is secured in a fixed manner to the pitman and has a rocking movement in the boxes 5. These latter are preferably in two parts for convenience in assembling the parts and to enable the boxes to be brought together to take up any looseness due to wear. The walls of the piston 1 have bores extending from their outer surfaces in and communicating with the ends of the pin 4, and the top surface of the piston is provided with the semicircular groove 7, which terminates at the bores extending into the pin 8. The groove 7 conducts the oil or other lubricant in the cylinder down to these bores, whence it enters the boxes and keeps the bearing for the pin 8 thoroughly lubricated. The end of the piston which receives the pitman is bored out in a circular manner for a suitable distance in from the end of the piston to receive the heads of the T-shaped blocks 9, which are inserted for the purpose of holding the boxes 5 in place. The stems of the blocks 9 enter the grooves in the walls of the recess 4 and bear against the adjacent half of the bearing-boxes 5. The blocks 9 are secured to the piston by means of the bolts 11, the heads of which bolts project at the end of the piston, where they are of easy access for turning when it becomes necessary to tighten the blocks 9 against the boxes 5 to take up the wear at said boxes. To permit of the necessary inward adjustment of the cross-arms of the block 9 to allow the stem of the block to approach the boxes 5, I provide the plates or washers 13, which will preferably be in a plurality of sections to permit one or more of same to be removed, as the necessities require.

The bores or holes extending through the walls of the piston to the ends of the pin 8 are shown in dotted lines in Fig. 3, as also is the groove 7, passing over the piston and terminating at these pin-holes.

Having thus fully described my invention, what I claim as new, and wish to secure by Letters Patent, is—

1. An engine-pitman having a fixed pin at its piston end, and a piston having journal-boxes at each side of the piston to receive the ends of said pin, means extending to that end of the piston which the pitman enters, for adjusting said boxes, and bolts having heads projecting from the same piston end for adjusting said means.

2. A hollow piston approximately twice the length of its diameter divided by a transverse wall into two compartments one of which is closed and in the other of which the pitman is connected, a pitman having a fixed pin, two-part journal-boxes mounted in the piston to receive the ends of the pin projecting on each side of the pitman, blocks bearing against the other box-half and extending to that end of the piston which the pitman enters, and bolts to hold the blocks firmly against the boxes.

3. A piston having a longitudinal end recess, a pitman entering said recess, a pin fixed in the inserted end of the pitman, two-part journal-boxes mounted in the piston to receive the ends of the pin, which project on each side of the pitman, blocks bearing against the outer box-half and extending to that end of the piston which the pitman enters, spacing-plates between the blocks and the piston to regulate the adjustment of the block longitudinally of the piston, and bolts to hold the block firmly against the boxes.

4. A hollow piston, a pitman having a fixed pin, journal-boxes mounted in the piston to receive the ends of the pin, outside oil-grooves across the top of the piston connecting the pin-holes, T-shaped blocks bearing against the boxes and extending to that end of the piston which the pitman enters, spacing-plates between the vertical arms of the blocks and the piston, and bolts to force the blocks against the boxes.

In witness whereof I have hereunto set my hand and seal, at Indianapolis, Indiana, this 29th day of February, A. D. 1904.

DUDLEY R. MORRISON. [L. S.]

Witnesses:
JOSEPH A. MINTURN,
S. MAHLON UNGER.